(12) United States Patent
McKinney

(10) Patent No.: US 7,213,786 B1
(45) Date of Patent: May 8, 2007

(54) LIFT UNIT FOR VERTICAL TAKE-OFF AND LANDING AERIAL VEHICLE

(76) Inventor: Charles Cecil McKinney, 6411 Oakdell Dr., Tampa, FL (US) 33634

( * ) Notice: Subject to any disclaimer, the term of this patent is extended or adjusted under 35 U.S.C. 154(b) by 226 days.

(21) Appl. No.: 10/968,330

(22) Filed: Oct. 18, 2004

(51) Int. Cl.
*B64C 27/22* (2006.01)
(52) U.S. Cl. .......................................... 244/10; 244/21
(58) Field of Classification Search ................ 244/10, 244/21, 23 B, 23 R
See application file for complete search history.

(56) References Cited

U.S. PATENT DOCUMENTS

| | | | |
|---|---|---|---|
| 1,875,276 A | * | 8/1932 | Steigert ........................ 244/10 |
| 1,927,538 A | * | 9/1933 | Zaparka ........................ 244/10 |
| 2,039,676 A | * | 5/1936 | Zaparka ........................ 244/21 |
| 2,344,515 A | * | 3/1944 | Massey ........................ 244/10 |
| 3,223,355 A | * | 12/1965 | Peterson ..................... 244/12.1 |
| 5,072,892 A | | 12/1991 | Carrington |
| 6,318,962 B1 | | 11/2001 | Sampaio |

* cited by examiner

*Primary Examiner*—Timothy D. Collins
*Assistant Examiner*—Benjamin P. Lee

(57) ABSTRACT

A lift unit for a vertical take-off and landing type aerial vehicle. A smooth, cylindrical rotor, rotating at a high rate, as close as is practicable to the smooth, inside of a half-cylindrical, cradle-shaped stator, generates lift. While there is no up or down force within the very small space between the rotor and stator, there is reduced aerodynamic pressure on the exposed upper half of the rotor. Atmospheric pressure remains normal beneath the stator, producing considerable lift. Panels designed to slide over portions of the rotor, vary the lift, either uniformly or differentially to provide control. The streamlined unit is attached in a plurality to the wing of a conventionally configured, fixed-wing aircraft with the axis of the rotor aligned parallel to the thrust line of the vehicle. This lift unit is very efficient and produces no downward efflux, facilitating rescue operations.

1 Claim, 8 Drawing Sheets

LIFT UNIT FOR VERTICAL TAKE-OFF AND LANDING AERIAL VEHICLE

CROSS-REFERENCE RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to a means for lifting and supporting an aerial vehicle.

2. Prior Art

Various means to accomplish vertical take-off and landing are known, such as rotating airfoils used on autogyros, helicopters, and tilt-wing aircraft. The autogyro requires forward motion of the entire vehicle, partially negating the advantage of being able to use a small take-off and landing area. The helicopter requires, comparatively, a large amount of power, because of the aerodynamic drag on the rotor, leading to inefficiencies. The helicopter is also mechanically complex, requiring swash plates, push rods, and anti-torque measures. The helicopter generates a lot of sound due to the beating of the air by the rotor blades. Another major drawback is that the forward velocity of the vehicle, as a whole, is limited because of the additive speeds of the vehicle and the forwardly advancing blade approaching mach one, disrupting and unbalancing lift. The helicopter also generates a great amount of downward efflux.

The vectored thrust machine has the same problem of excessive downward efflux, since it is dependent upon the action/reaction principle.

The tilt-wing aircraft is complex, mechanically, requiring an engine of a weight and class able to produce enormous thrust for take-off, making the craft heavy and overpowered for cruising flight.

The vertiplane, utilizing oversized propellers blowing air over a highly cambered wing with large flaps, has been marginally successful, but also requires a lot of power for relatively small payloads.

A device, reference U.S. Pat. No. 6,318,962 (Nov. 20, 2001) to Sampio, addresses some of these problems, but is not configured in the most advantageous way for cruising flight. The rotor element of this device also sets the air into motion relative to itself, leading to inefficiencies. Since the rotor of this device depends upon the viscosity of the air to cause the air to be put into motion with the rough rotor, essentially the thin boundary layer moves in unison with the rotor, with motion diminishing quickly as distance from the rotor increases.

The inventor of this device was also concerned about external turbulence, to the extent of his adding to his device a peripheral wall to shield its negative effect.

The Sampio device does not seem to lend itself well to streamlining. It would appear that the bladed version mentioned by the inventor would be the most likely to succeed, but is not significantly different in principle to the vertiplane, except that air is set in motion only over the upper surface of the planar element and not the under surface.

Another device, reference U.S. Pat. No. 5,072,892 (Dec. 17, 1991) to Alfred C. Carrington, uses two contra-rotating, inflow ducted fans to force a great deal of air into a plenum chamber, and then to a central nozzle to direct the efflux downward, utilizing the action/reaction principle. This arrangement requires stabilizing devices, which are complex, since the vehicle is balanced on and rises on a narrow column of efflux.

Most of the successful vertical take-off vehicles to date are to some extent dependent upon the action/reaction principle, or a combination of that principle and the Bernoulli and Coanda effects, for example, inflow of air over a curved, circular lip to produce lift by the Bernoulli effect. This means that such vehicles literally rise aloft on a powerful, downward directed efflux, which would be desirable to be limited or eliminated, as long as the vertical take-off capacity is still achieved.

Other aerodynamic devices, of which I am aware, are airfoils employing the Bernoulli and Coanda effects, as well as, devices utilizing the Magnus effect, such as the Flettner ship propulsion rotor, which requires an existing wind to create a differential force.

OBJECTS AND ADVANTAGES

Since this lift unit operates by a different principle and mechanism, accordingly, several objects and advantages of this invention are:

(a) to operate without generating downward efflux;

(b) to operate very efficiently, as turning torque is greatly reduced;

(c) to operate with a forward speed not limited in the same way as is a helicopter, since this lift unit is attached to a conventional fixed-wing aircraft;

(d) to operate more safely than the helicopter, since this lift unit is buoyed up from underneath, rather than having the entire vehicle suspended from an axle;

(e) to operate with much less noise;

(f) to operate as a streamlined unit;

(g) to operate with stability due to the unit's inherent gyroscopic feature;

(h) to operate with less power consumption since the lift unit has no need to set air in motion relative to itself;

(i) to operate with ease of piloting since the lift unit is attached to an ordinary airplane;

(j) to operate with a great deal of lift generated by a relatively small lift surface;

(k) to operate with no debris blown around, enabling vehicle equipped with this lift unit to access smaller areas in urban environments;

(l) to operate as lift unit for medivac and rescue aircraft.

Further advantages will become apparent from the ensuing drawings and description, especially to anyone familiar with the aerodynamic arts.

SUMMARY

This invention is a lift unit for an aerial vehicle using a smooth cylindrical rotor driven to rotate within a half cylindrical cradle at close proximity. When the lift unit is attached to the superstructure of an aircraft wing, and the rotor is rotated rapidly, pressure is lowered on the exposed upper half of the rotor, and the cradle is pushed upward from underneath.

DRAWINGS—FIGURES

DRAWINGS—REFERENCE NUMERALS

Figure 1:
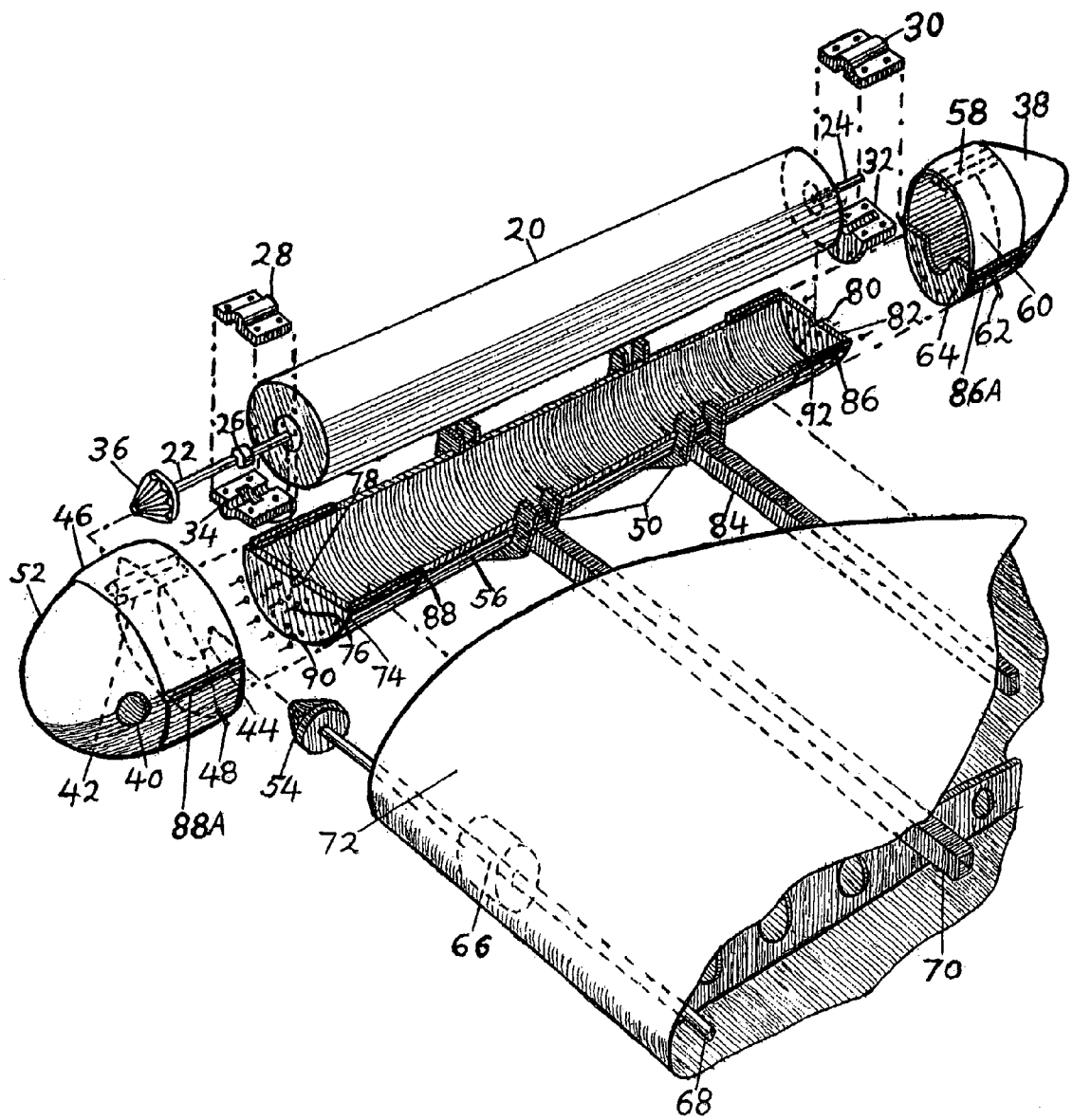
FIG. 1 shows an exploded, perspective view of the entire lift unit, with its means of mounting and all the reference numerals to designate all of the components. Shading has been provided to give a three-dimensional pictorial effect to indicate depth, contour, and intersection of planes in order to make the drawing more understandable at a glance.

| 20 | lift unit rotor | 20A | alternative lift unit rotor, with streamlining elements contiguous with rotor |
|---|---|---|---|
| 22 | forward axle segment | 24 | aft axle segment |
| 26 | shoulder on axle | 28 | forward bearing cap |
| 30 | aft bearing cap | 32 | aft bearing base |
| 34 | forward bearing base | 36 | power take-off gear |
| 38 | aft streamlining element | 40 | shaft pass-through hole |
| 42 | forward double-action hydraulic actuator | 44 | base of forward streamlining element |
| 46 | forward lift variation panel | 48 | hydraulic line |
| 50 | stator mounting flanges | 52 | forward streamlining element |
| 54 | power transfer gear | 56 | stator |
| 56A | alternative contoured stator | 58 | rear double-action hydraulic actuator |
| 60 | rear lift variation panel | 62 | rear hydraulic line |
| 64 | base of rear streamlining element | 66 | bearing for power transfer shaft shown in phantom lines in FIG. 1 |
| 68 | power transfer shaft | 68A | power transfer shaft to opposing lift unit rotor |
| 70 | forward wing spar | 72 | aircraft wing |
| 74 | forward base of stator | 76 | nut and bolt fasteners |
| 78 | axle passage on forward stator base | 80 | axle passage on aft stator base |
| 82 | aft stator base | 84 | rear wing spar |
| 86 | aft guide on stator for lift variation panel | 86A | aft guide on streamlining element for lift variation panel |
| 88 | forward guide on stator for lift variation panel | 88A | forward guide on streamlining element for lift variation panel |
| 90 | forward drain hole | 92 | rear drain hole |
| 93 | power shaft to means of propulsion | 94 | gear grouping for transferring rotational energy |
| 95 | gap between rotor and stator | 96 | external gear and shaft housing |

DETAILED DESCRIPTION—PREFERRED EMBODIMENT

The structure of this lift unit, as shown in FIG. 1, is comprised of a smooth, polished cylindrical rotor, 20, cast in one piece of aluminum alloy. This rotor, 20, is designed to rotate at a high rate at a distance of a very small gap, 95, which is a fraction of a millimeter from the smooth, polished inside of a stator, 56, which is cradle shaped, and, also, cast of aluminum alloy. The rotor has axle segments, 22 and 24, cast of steel and affixed to its bases by nut and bolt fasteners, 76. Bearing bases and caps, 28,30,32, and 34, comprise competed bearings for the axle segments of the rotor. The completed bearing is fastened to the bases, 74 and 82, of the stator with nut and bolt fasteners, 76. Passages, 78 and 80, for the axle segments of the rotor are provided in the bases, 74 and 82, of the stator. The forward axle segment is cast with a shoulder, 26, to fit within a contour inside its bearing, shown with bearing base 34. The purpose of this shoulder is to prevent fore and aft slipping of the rotor. A power take-off gear, 36, is affixed to the forward axle segment, 22.

Streamlining elements, 38 and 52, are fastened with nut and bolt fasteners, of the same type as reference number 76, to the bases, 74 and 82, of the stator, 56, by the bases, 44 and 64, of the streamlining elements. The forward streamlining element is provided with a pass-through hole, 40, for the power transfer shafts, 68 and 68A.

The stator, 56, is provided with semi-encircling flanges, 50, to mount the lift unit to the superstructure of a wing, 72, by spars, 70 and 84. Bearings of the type shown in phantom lines as 66 within the wing for the power transfer shaft are provided.

The stator is provided with fore and aft water drain holes, 90 and 92.

Hydraulic actuators, 42 and 58, attached to hydraulic lines, 48 and 62, are within streamlining elements. Hydraulic lines to cockpit are not shown in drawing for clarity.

Note: as a plurality of lift units is mounted on a wing, all parts have corresponding parts in each lift unit. The hydraulic actuators are to facilitate movement of the lift variation panels, 46 and 60, within guides, 86,86A,88, and 88A.

ALTERNATIVE EMBODIMENTS

Figure 2:
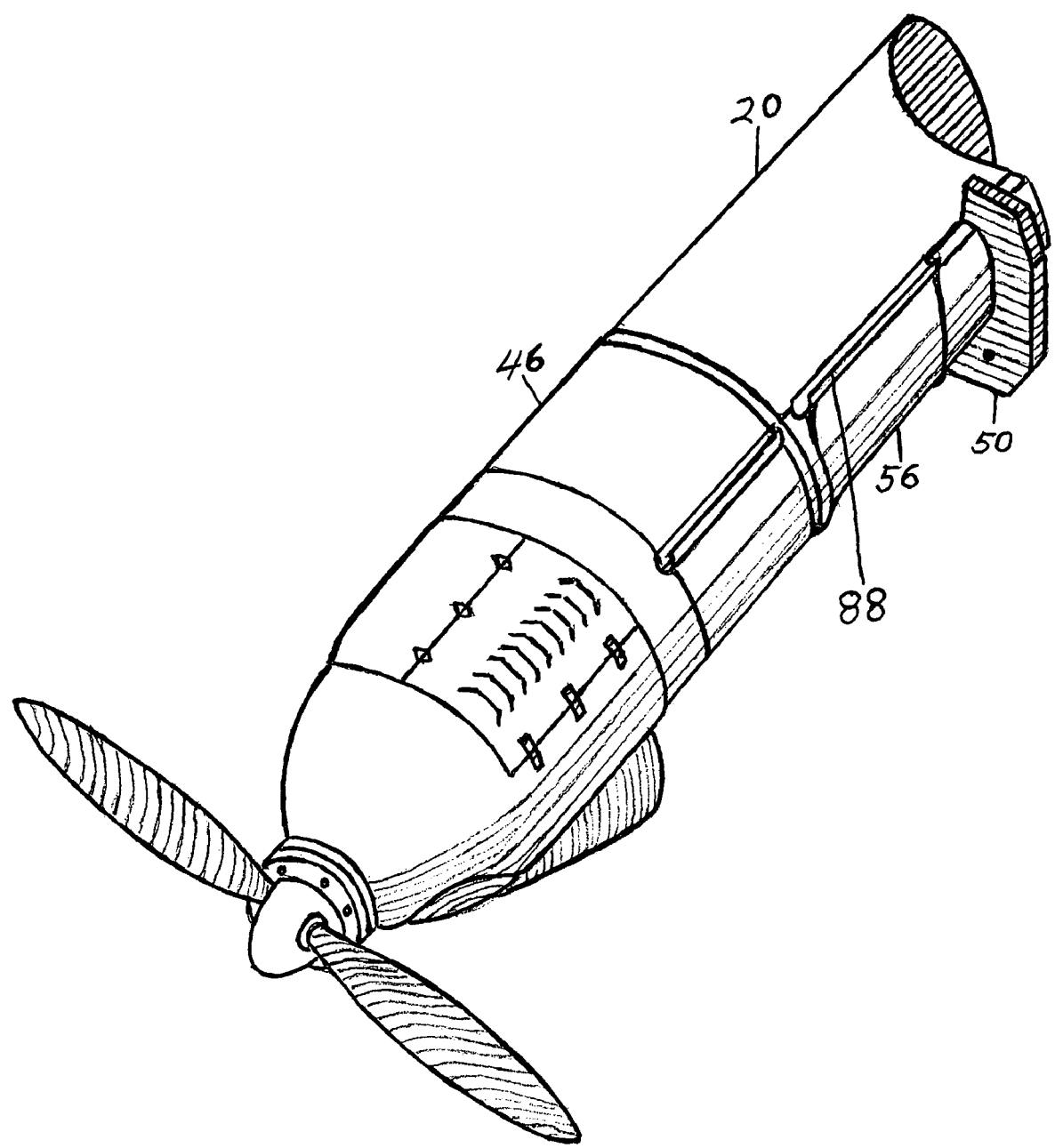
FIG. 2 shows an alternative embodiment whereby an engine is mounted directly on the lift unit, and drives both the lift unit rotor and the means of propulsion.

An alternative embodiment, as shown in FIG. 2, is comprised of an engine to rotate the lift unit rotor, 20, as well as, the means of propulsion, having been mounted on the stator, 56, of the lift unit.

Figure 3:
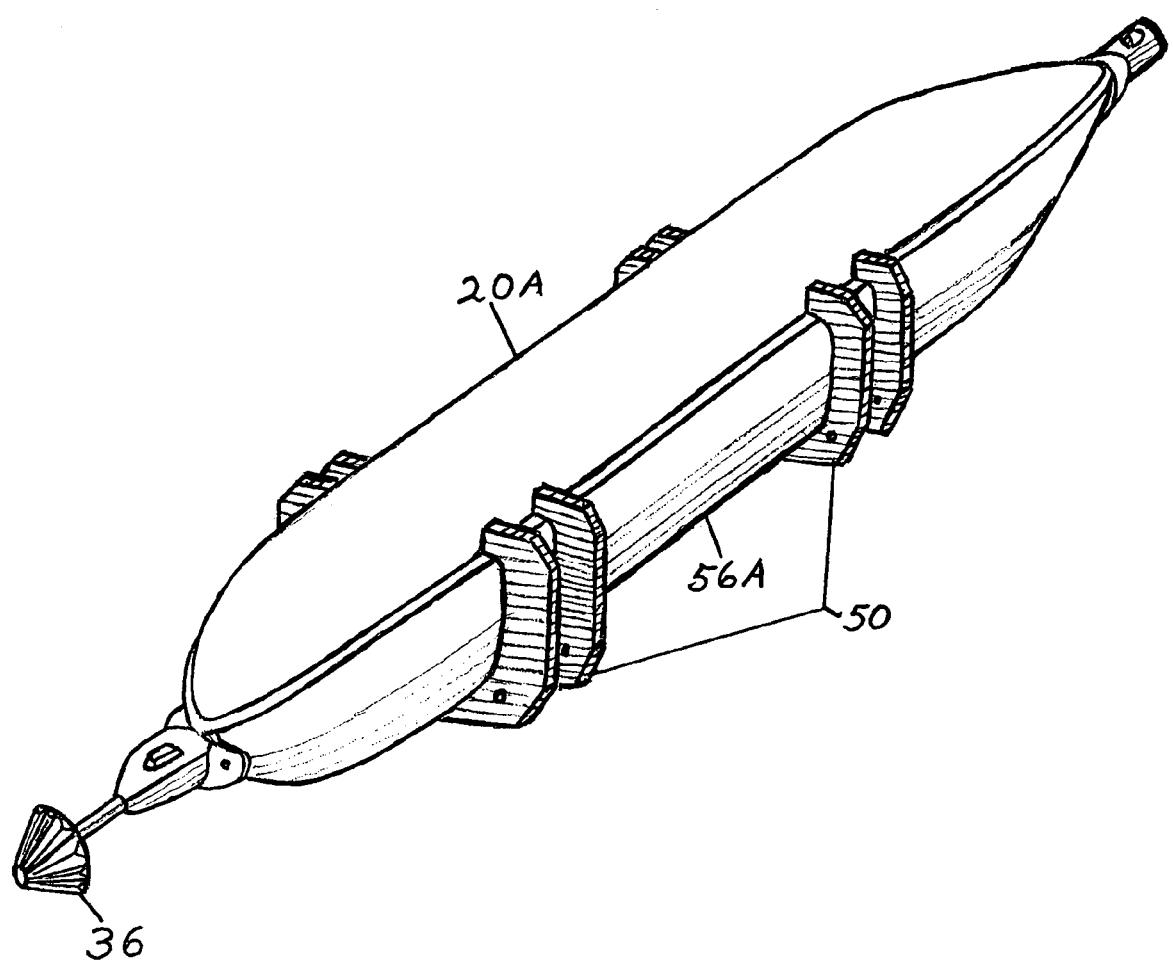
FIG. 3 shows an alternative embodiment with the rotor and stator streamlined and contoured so that streamlining elements are not separate sections.

A further embodiment, as shown in FIG. 3, is comprised of the rotor, 20A, and stator, 56A, having been contoured to accomplish streamlining by consolidation.

CONCLUSIONS, RAMIFICATIONS, AND SCOPE

Although various configurations are possible, any configuration utilizing a smooth, cylindrical rotor, rotating within a half-cylindrical stator at a very small uniform gap between the rotor and stator, as the means of generating lift, will be within the scope of this invention. Any specific dimensions and materials noted are not meant to limit the scope of this invention, but are noted for the purpose of explaining how to make and use the lift unit. The above description and enclosed drawings will make clear to anyone skilled in the aerodynamic arts additional ways and means of employing this lift unit.

Figure 4:
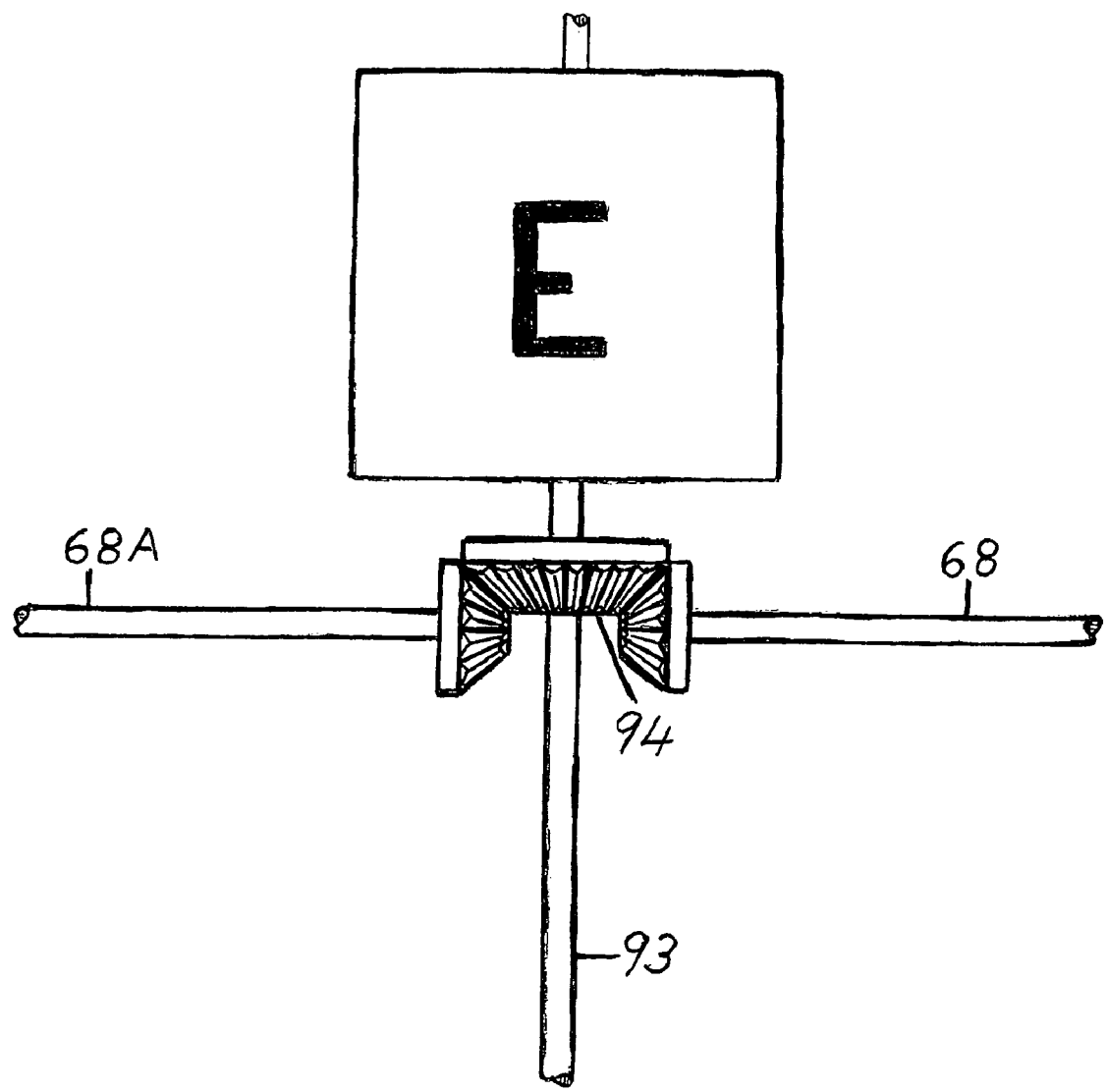
FIG. 4 shows a rectangle enclosing a large "E" to indicate an inboard engine with shafts and gears to transmit rotational energy, and to be able to change the direction of the rotational power to the lift unit rotor, as well as, the means of propulsion.
Figure 5:
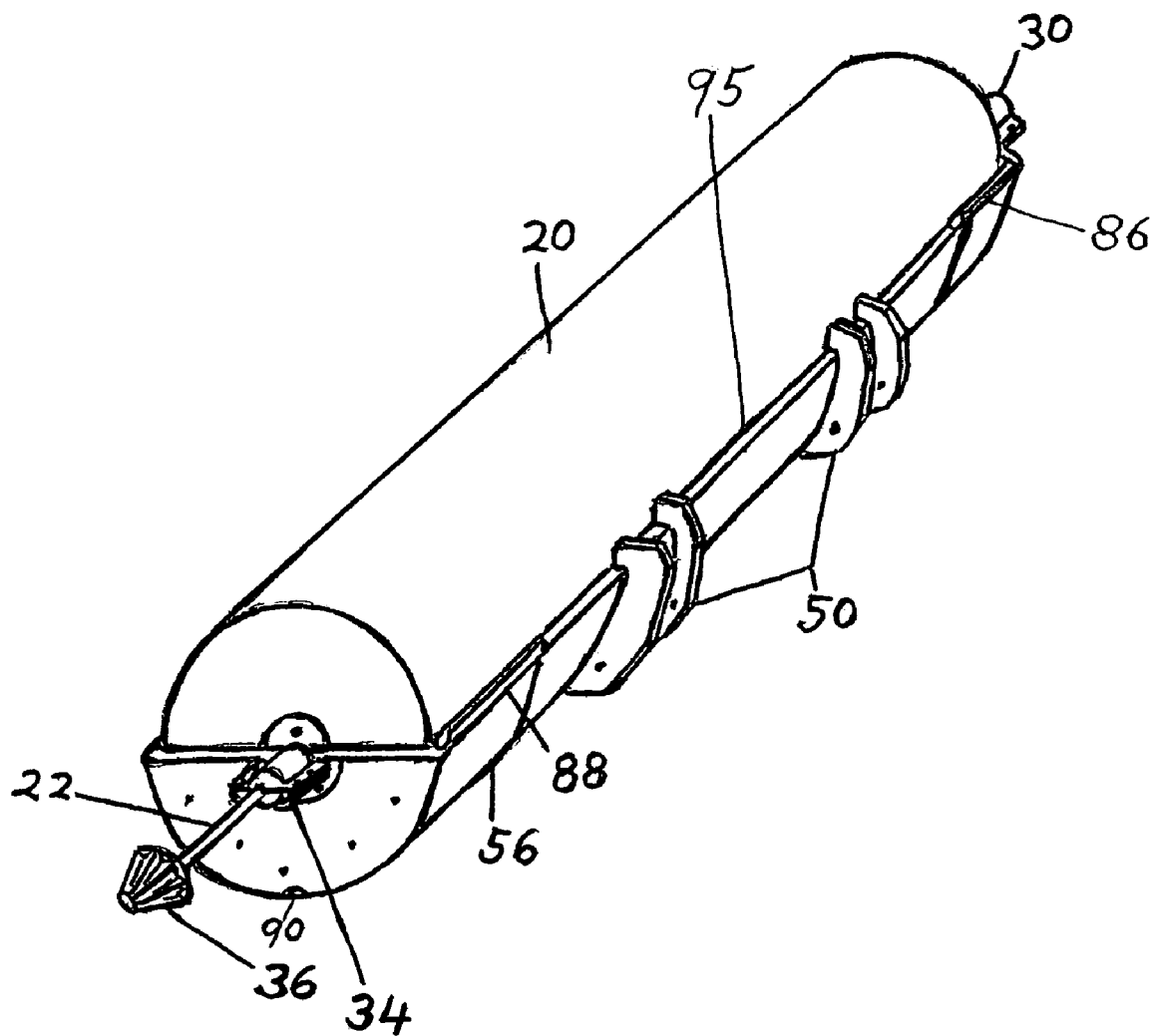
FIG. 5 shows the lift unit rotor cradled within the stator, with mounting flanges, axles, bearings, and a power take-off gear.
Figure 6:
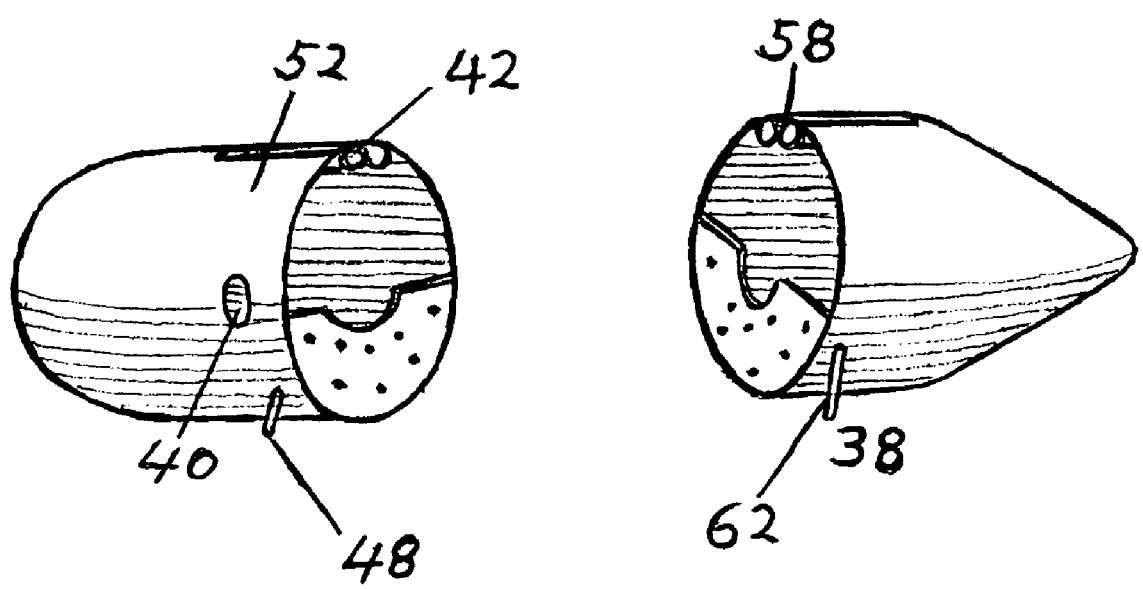
FIG. 6 shows the streamlining elements containing hydraulic attachments and the pass-through hole for the power shaft, as well as, the means of mounting them to the stator by their bases.
Figure 7:
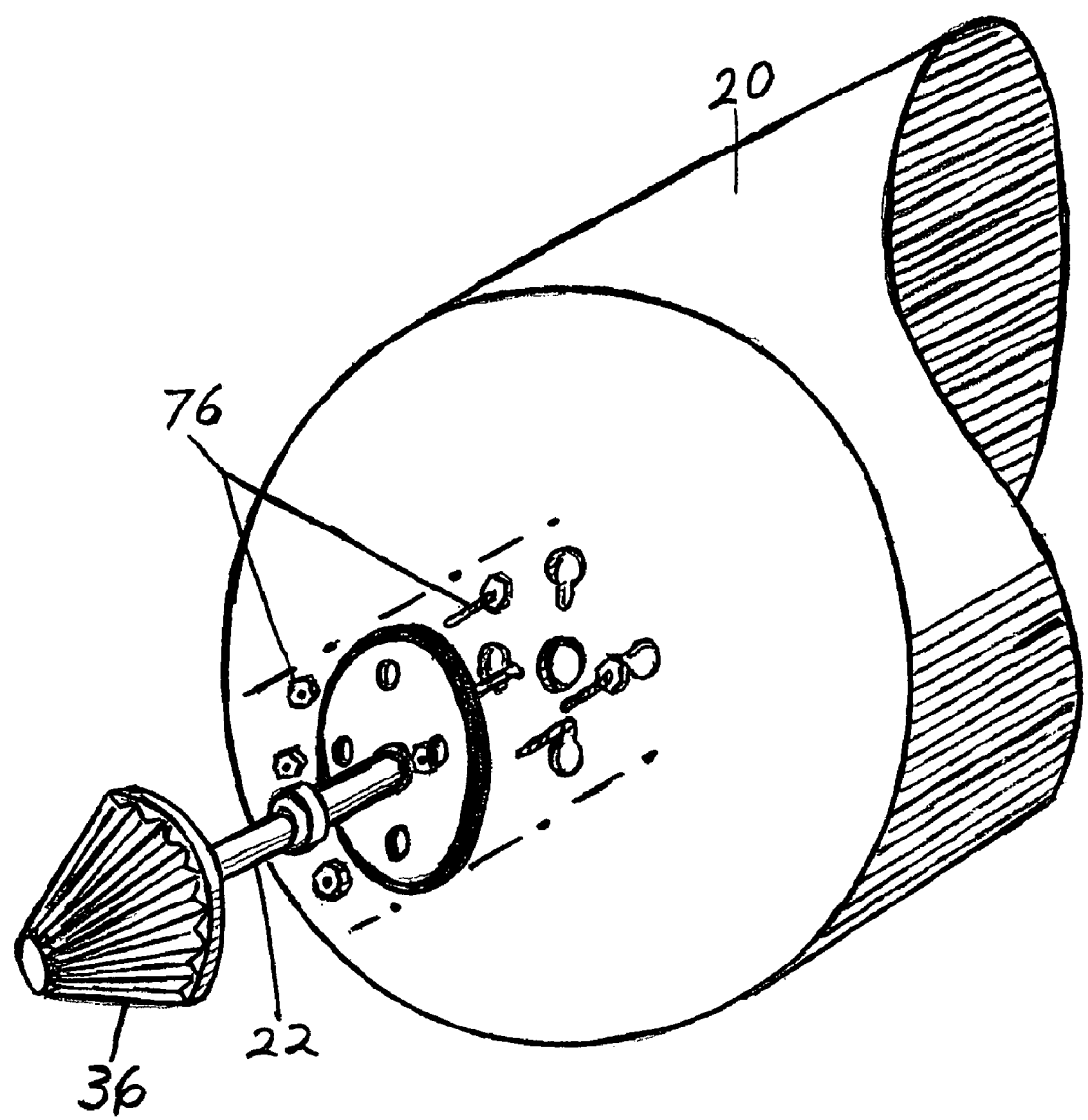
FIG. 7 shows the means of attaching the axle segments and power take-off gear to the lift unit rotor.
Figure 8:
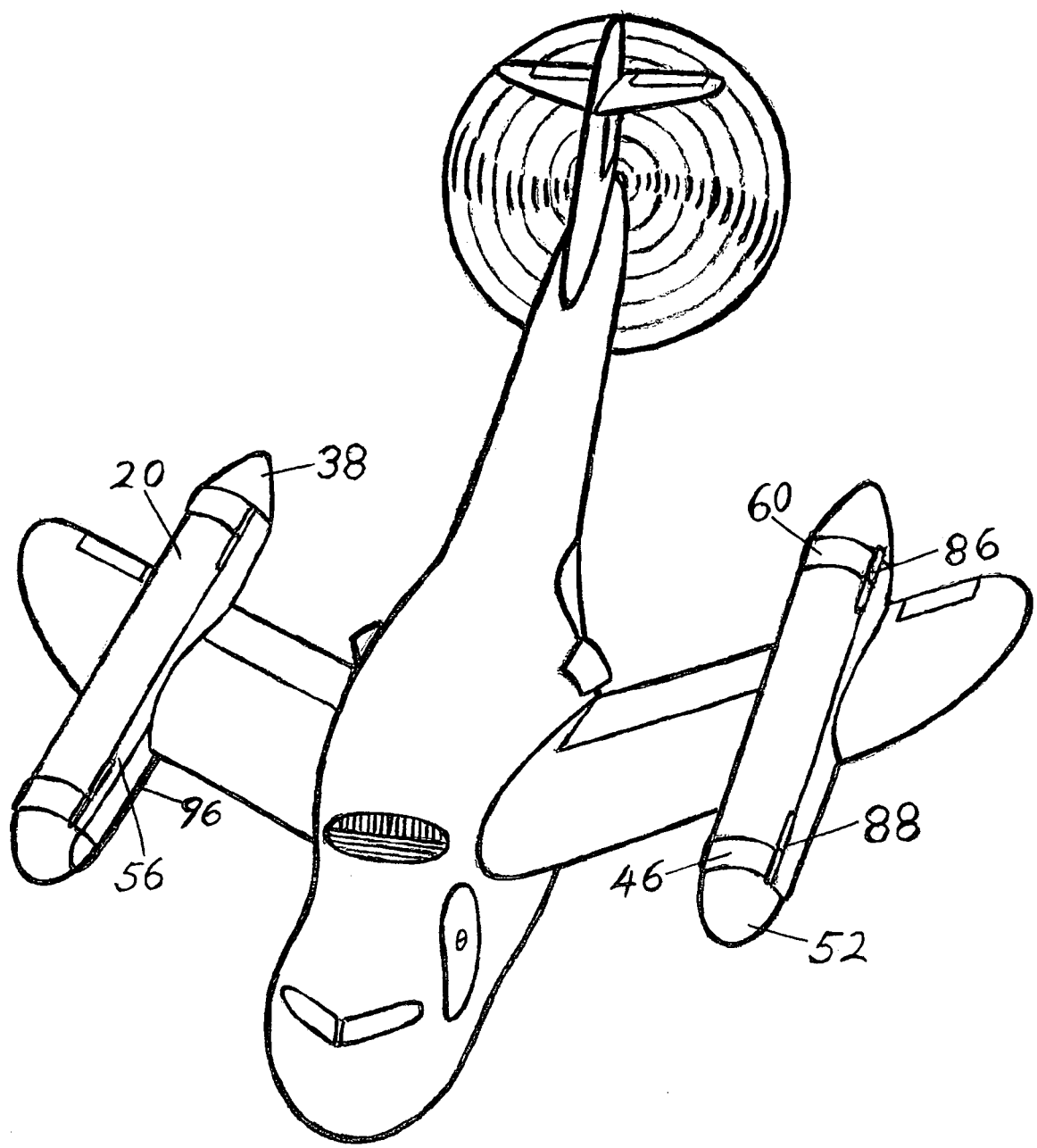
FIG. 8 shows lift units mounted on the wing of an aircraft in flight, with a pusher propeller and a streamlined housing for one additional change of direction for the shaft and gear power-train, allowing for a more balanced configuration.

I envision the lift units attached to a conventionally configured aircraft, as shown in FIG. 8, driven from an inboard engine, designated by an "E" in a rectangle in FIG. 4, with a gear and shaft grouping, 94, to transfer rotational energy to the rotors of the lift units, as well as, a shaft, 93, to power the propulsion means, shown in FIG. 8, as a pusher propeller. A streamlined external gear and shaft housing, 96, is also shown in FIG. 8.

Operation of the Lift Unit

The objects and advantages of this invention arise from its being a means of applying the principles described in the following, when in operation.

In any static pressure system, such as air, the static pressure is exerted in every possible direction, the resultants of which are deemed to press perpendicular to any surface at atmospheric pressure. When any surface is put into motion in such a system, these resultants are forced to slant. Although the resultants contain more total energy, a parallelogram of forces will show that the adjusted, slanted resultants are not able to exert as much downward pressure against the surface as the normal static pressure.

Further support for this idea comes from consideration of a closed right circular cone. For example, such a cone with a slope of 45 degrees will have a slope area twice that of its base. Yet, the cone does not move in a static system because the resultants that are perpendicular to the slope are slanted 45 degrees relative to vertical, so that those resultants exert only half the pressure, but over twice the area, resulting in equilibrium. It is known from comparison of dynamic pressure to static pressure that a square foot of surface has a static atmospheric pressure of approximately 2116 lb. exerted upon it, while a square foot surface moving flatly against the air at 169 ft/second has a drag force, or dynamic pressure, of 33.9-lb/sq ft. Since drag increases by the square, or an exponent of 2, a two-foot diameter rotor, 20, rotating so that the surface of the cylinder has a speed of 900 ft/second (which is very reasonable for a smooth cylinder, as compressor and turbine applications far exceed this speed). The dynamic pressure is calculated in the following manner: 900 divided by 169 equals approximately 5.3. 5.3 squared equals approximately 28. Then 28 times 33.9 is approximately 949.2 lb. A parallelogram of forces with a vertical line representing 2116 lb. and a horizontal line representing 949 lb. will generate a diagonal angle of approximately 23 degrees plus 7 degrees additional from a geometric effect to be explained later. A resultant at 30 degrees to vertical is thereby generated. Since 30 degrees is one-third of 90 degrees, the force exerted by the resultant is two-thirds of the length of the diagonal of the parallelogram. This force, when compared to the line representing the static pressure, is between 500 and 700 pounds less. Thus, a 10-foot long rotor, 2-feet in diameter, is capable of producing 5 tons of lift under the above conditions.

The afore mentioned geometric effect is produced by the fact that an angle already exists on either side of a point on the surface of a cylinder with a tangent line. When motion commits the slanted resultant of dynamic and static pressures, an additional 7 degrees is contributed to the slant, just by virtue of geometry.

To apply this concept to the current invention, a smooth cylindrical rotor, 20, is rotated at a high rate, at a small gap, 95, from the smooth inside of a half-cylindrical stator, 56. The rotor drags a very thin boundary layer of air through the gap past a thin, stationary boundary layer on the stator, producing a state of equilibrium in the gap. Since the downward pressure on the exposed upper half of the rotor is effectively side-slipped, and diminished, while the gap has a net zero force, the pressure beneath the stator, being normal and larger, buoys the lift unit upward.

An alternative method of calculating lift is as follows:

Lift equals a coefficient of lift times surface area times half of air density in slugs times velocity, squared. Since a rotating cylinder has no angle of attack, its coefficient of lift is between 0.5 and 0.6, giving a result very near the geometric method.

A simplified way of thinking of what occurs in the gap is that whatever pressure exists therein is shared equally by the two surfaces in very close proximity, with no net upward or downward force existing within the gap.

The lift variation panels, 46 and 60, act like spoilers of lift to enable the lift units to tip off of horizontal for control purposes. When the panels slide over the rotor, 20, the lift is disrupted under it, just as it is inside the gap, 95, beneath the rotor. The lift units, as well as the vehicle to which they are attached, can be made to shift its center of gravity by means of a cockpit control, and conventional servomechanisms similar to the way control surfaces on a conventional aircraft are maneuvered. If the forward lift variation panels in a two-unit system are slid over the rotor, the nose of the vehicle will tip downward. If the aft panels are slid over the rotor, the nose will tip upward. If both panels on one of the lift units are slid over the rotor, that wing side will tip down, for control in wind. Since nothing is ever pulled, but is always pushed, in a static pressure system, nothing is ever sucked, but is always pushed or blown. This vehicle is not supported by its axle like a helicopter, but is buoyed up from underneath, not sucked upward, which enhances safety.

I claim:

1. A device, having a spinning cylindrical rotor as means for generating an effect of a reduction of atmospheric pressure adjacent to its outside surface and subsequently, by means of contoured partially enclosing surfaces, nullifying said effect of a reduction of atmospheric pressure, selectively, as means for causing an imbalance of atmospheric pressure for providing aerodynamic lift for an aerial vehicle, said device, herein called a lift unit, being made substantially of aluminum, as well as any material being the structural equivalent of aluminum in terms of weight, strength and formability, said lift unit being manufacturable in multiples, as means for a plurality of said lift unit being used as means for symmetrical aerodynamic lift, on said aerial vehicle, comprising: an elongated circular cylinder of substantial diameter, being hollow and having a polished outside surface, said cylinder having axle segments attached at its extremities, with one said axle segment, having a gear attached as means for receiving rotational energy for said cylindrical rotor; with said cylinder, said axle segments and said gear, communicating to form said cylindrical rotor; further comprising: a stator which is a stationary contoured means for enclosing one half of said cylindrical rotor, from extremity to extremity along its longitudinal axis of rotation, as a means for nullifying said effect of a reduction of atmospheric pressure, within the enclosed area of said stator, said stator having locations at its ends as means for bearings to be fastened for receiving said cylindrical rotor, said stator being positioned at a very small, uniform predetermined gap from said cylindrical rotor, said stator having further means thereon, for mounting said lift unit to the wing of said aerial vehicle; further comprising: streamlining means, also fastened to said ends of said stator, said streamlining means for facilitating horizontal flight of said aerial vehicle, after vertical flight is accomplished, said streamlining means having locations thereon, as means for fastening lift variation panels, said lift variation panels, being slidable contoured panels, made able by hydraulic means, for enclosing portions of said cylindrical rotor, selectively, as means to vary aerodynamic lift for accomplishing flight attitude control during the slow aspect of vertical flight of said aerial vehicle; whereby, as said longitudinal axis of said cylindrical rotor is oriented horizontally with said stator facing downwards as means for having a reduced atmospheric pressure above said lift unit adjacent to the exposed half of said cylindrical rotor facing upwards, with normal atmospheric pressure underneath said lift unit, said lift unit mounted to the wing of said aerial vehicle, with said axis of rotation oriented parallel to the thrust line of said aerial vehicle as means to generate vertical aerodynamic lift when said cylindrical rotor is rotating at a high predetermined rate.

* * * * *